United States Patent
Neiger et al.

(10) Patent No.: US 7,020,738 B2
(45) Date of Patent: Mar. 28, 2006

(54) METHOD FOR RESOLVING ADDRESS SPACE CONFLICTS BETWEEN A VIRTUAL MACHINE MONITOR AND A GUEST OPERATING SYSTEM

(75) Inventors: Gilbert Neiger, Portland, OR (US); Stephen Chou, North Plainfield, NJ (US); Erik Cota-Robles, Portland, OR (US); Stalinselvaraj Jevasingh, Portland, OR (US); Alain Kagi, Portland, OR (US); Michael Kozuch, Beaverton, OR (US); Richard Uhlig, Hillsboro, OR (US); Sebastian Schoenberg, Dresden (DE)

(73) Assignee: Intel Corporation, Santa Clara, CA (US)

( * ) Notice: Subject to any disclaimer, the term of this patent is extended or adjusted under 35 U.S.C. 154(b) by 114 days.

(21) Appl. No.: 10/676,737

(22) Filed: Sep. 30, 2003

(65) Prior Publication Data

US 2004/0064813 A1    Apr. 1, 2004

Related U.S. Application Data

(63) Continuation of application No. 09/752,587, filed on Dec. 27, 2000.

(51) Int. Cl.
*G06F 13/00* (2006.01)
(52) U.S. Cl. .............................. 711/6; 711/165; 711/203
(58) Field of Classification Search .................. 711/6, 711/165, 203
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | 714/18 |
| 4,207,609 A | 6/1980 | Luiz et al. | |
| 4,247,905 A | 1/1981 | Yoshida et al. | |

(Continued)

FOREIGN PATENT DOCUMENTS

DE    4217444    12/1992

(Continued)

OTHER PUBLICATIONS

Lawton, K. "Running Multiple Operating Systems Concurrently on an IA32 PC Using Virtualization Techniques,"; http://www.plex86.org/research/paper.txt., pp. 1-31. Last Updated Nov. 29, 1999.*

(Continued)

*Primary Examiner*—Reba I. Elmore
(74) *Attorney, Agent, or Firm*—Thomas R. Lane

(57) ABSTRACT

One embodiment of the invention is method for resolving address space conflicts between a virtual machine monitor and a guest operating system. The method includes allocating an address space for the operating system and an address space for the monitor. The method also includes mapping a portion of the monitor into the address space allocated for the operating system and the address space allocated for the monitor, and locating another portion of the monitor in the address space allocated for the monitor. The method also includes detecting that the operating system attempts to access a region occupied by the portion of the monitor within the address space allocated for the operating system, and relocating that portion of the monitor within that address space to allow the operating system to access the region previously occupied by that portion of the monitor.

30 Claims, 7 Drawing Sheets

U.S. PATENT DOCUMENTS

| | | | |
|---|---|---|---|
| 4,276,594 A | 6/1981 | Morley | 713/600 |
| 4,278,837 A | 7/1981 | Best | |
| 4,307,214 A | 12/1981 | McDaniel et al. | |
| 4,307,447 A | 12/1981 | Provanzano et al. | 700/1 |
| 4,319,233 A | 3/1982 | Matsuoka et al. | |
| 4,319,323 A | 3/1982 | Ermolovich et al. | 711/100 |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen | |
| 4,521,852 A | 6/1985 | Guttag | |
| 4,571,672 A | 2/1986 | Hatada et al. | |
| 4,621,318 A | 11/1986 | Maeda | |
| 4,759,064 A | 7/1988 | Chaum | 380/30 |
| 4,795,893 A | 1/1989 | Ugon | 235/382 |
| 4,802,084 A | 1/1989 | Ikegaya et al. | |
| 4,825,052 A | 4/1989 | Chemin et al. | 235/380 |
| 4,907,270 A | 3/1990 | Hazard | 713/181 |
| 4,907,272 A | 3/1990 | Hazard et al. | 705/65 |
| 4,910,774 A | 3/1990 | Barakat | 705/67 |
| 4,975,836 A | 12/1990 | Hirosawa et al. | |
| 5,007,082 A | 4/1991 | Cummins | 713/164 |
| 5,022,077 A | 6/1991 | Bealkowski et al. | |
| 5,075,842 A | 12/1991 | Lai | |
| 5,079,737 A | 1/1992 | Hackbarth | |
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,291,605 A * | 3/1994 | Takagi et al. | 710/48 |
| 5,293,424 A | 3/1994 | Holtey et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,434,999 A | 7/1995 | Goire et al. | 717/167 |
| 5,437,033 A | 7/1995 | Inoue et al. | |
| 5,442,645 A | 8/1995 | Ugon et al. | 714/736 |
| 5,455,909 A | 10/1995 | Blomgren et al. | |
| 5,459,867 A | 10/1995 | Adams et al. | 719/321 |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | 703/25 |
| 5,506,975 A | 4/1996 | Onodera | |
| 5,511,217 A | 4/1996 | Nakajima et al. | |
| 5,522,075 A | 5/1996 | Robinson et al. | |
| 5,528,231 A | 6/1996 | Patarin | 340/5.8 |
| 5,533,126 A | 7/1996 | Hazard | 713/187 |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubals | 711/173 |
| 5,566,323 A | 10/1996 | Ugon | 711/154 |
| 5,568,552 A | 10/1996 | Davis | |
| 5,574,936 A | 11/1996 | Ryba et al. | |
| 5,582,717 A | 12/1996 | Di Santo | 210/86 |
| 5,604,805 A | 2/1997 | Brands | |
| 5,606,617 A | 2/1997 | Brands | 380/30 |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,684,948 A | 11/1997 | Johnson et al. | |
| 5,706,469 A | 1/1998 | Kobayashi | |
| 5,717,903 A | 2/1998 | Bonola | |
| 5,720,609 A | 2/1998 | Pfefferle | 431/326 |
| 5,721,222 A | 2/1998 | Bernstein et al. | 514/89 |
| 5,729,760 A | 3/1998 | Poisner | |
| 5,737,604 A | 4/1998 | Miller et al. | |
| 5,737,760 A | 4/1998 | Grimmer, Jr. et al. | |
| 5,740,178 A | 4/1998 | Jacks et al. | |
| 5,752,046 A | 5/1998 | Oprescu et al. | |
| 5,757,604 A | 5/1998 | Bennett et al. | |
| 5,757,919 A | 5/1998 | Herbert et al. | |
| 5,764,969 A | 6/1998 | Kahle et al. | |
| 5,796,835 A | 8/1998 | Saada | 713/172 |
| 5,796,845 A | 8/1998 | Serikawa et al. | |
| 5,805,712 A | 9/1998 | Davis | |
| 5,809,546 A | 9/1998 | Greenstein et al. | |
| 5,825,875 A | 10/1998 | Ugon | 705/65 |
| 5,825,880 A | 10/1998 | Sudia et al. | |
| 5,835,594 A | 11/1998 | Albrecht et al. | 713/187 |
| 5,844,986 A | 12/1998 | Davis | |
| 5,852,717 A | 12/1998 | Bhide et al. | |
| 5,854,913 A | 12/1998 | Goetz et al. | |
| 5,867,577 A | 2/1999 | Patarin | 705/67 |
| 5,872,994 A | 2/1999 | Akiyama et al. | |
| 5,890,189 A | 3/1999 | Nozue et al. | |
| 5,900,606 A | 5/1999 | Rigal et al. | 235/375 |
| 5,901,225 A | 5/1999 | Ireton et al. | 714/7 |
| 5,903,752 A | 5/1999 | Dingwall et al. | 718/103 |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,944,821 A | 8/1999 | Angelo | |
| 5,953,502 A | 9/1999 | Helbig, Sr. | |
| 5,956,408 A | 9/1999 | Arnold | |
| 5,970,147 A | 10/1999 | Davis | 713/172 |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | 713/200 |
| 6,075,938 A | 6/2000 | Bugnion et al. | |
| 6,085,296 A | 7/2000 | Karkhanis | |
| 6,088,262 A | 7/2000 | Nasu | |
| 6,092,095 A | 7/2000 | Maytal | 718/100 |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | 713/153 |
| 6,125,430 A | 9/2000 | Noel et al. | |
| 6,131,166 A | 10/2000 | Wong-Insley | |
| 6,148,379 A | 11/2000 | Schimmel | |
| 6,158,546 A | 12/2000 | Hanson et al. | |
| 6,173,417 B1 | 1/2001 | Merrill | 714/15 |
| 6,175,924 B1 | 1/2001 | Arnold | |
| 6,175,925 B1 | 1/2001 | Nardone et al. | |
| 6,178,509 B1 | 1/2001 | Nardone et al. | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | 713/165 |
| 6,222,923 B1 | 4/2001 | Schwenk | 380/44 |
| 6,249,872 B1 | 6/2001 | Wildgrube et al. | |
| 6,252,650 B1 | 6/2001 | Nakamura | 355/69 |
| 6,269,392 B1 | 7/2001 | Cotichini et al. | 709/200 |
| 6,272,533 B1 | 8/2001 | Browne | |
| 6,272,637 B1 | 8/2001 | Little et al. | |
| 6,275,933 B1 | 8/2001 | Fine et al. | |

| | | | |
|---|---|---|---|
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | |
| 6,301,646 B1 | 10/2001 | Hostetter et al. | |
| 6,308,270 B1 | 10/2001 | Guthery et al. | 713/200 |
| 6,314,409 B1 | 11/2001 | Schneck et al. | |
| 6,321,314 B1 | 11/2001 | Van Dyke | |
| 6,327,652 B1 | 12/2001 | England et al. | |
| 6,330,670 B1 | 12/2001 | England et al. | 713/2 |
| 6,339,815 B1 | 1/2002 | Feng et al. | |
| 6,339,816 B1 | 1/2002 | Bausch | |
| 6,357,004 B1 | 3/2002 | Davis | 713/100 |
| 6,363,485 B1 | 3/2002 | Adams et al. | 713/186 |
| 6,374,286 B1 | 4/2002 | Gee et al. | 718/108 |
| 6,374,317 B1 | 4/2002 | Ajanovic et al. | |
| 6,378,068 B1 | 4/2002 | Foster et al. | 713/1 |
| 6,378,072 B1 | 4/2002 | Collins et al. | 713/187 |
| 6,389,537 B1 | 5/2002 | Davis et al. | 713/187 |
| 6,397,242 B1 | 5/2002 | Devine et al. | |
| 6,397,379 B1 | 5/2002 | Yates, Jr. et al. | |
| 6,412,035 B1 | 6/2002 | Webber | 710/261 |
| 6,421,702 B1 | 7/2002 | Gulick | 718/102 |
| 6,435,416 B1 | 8/2002 | Slassi | 235/492 |
| 6,445,797 B1 | 9/2002 | McGough et al. | 380/285 |
| 6,463,535 B1 | 10/2002 | Drews et al. | 713/176 |
| 6,463,537 B1 | 10/2002 | Tello | 713/182 |
| 6,499,123 B1 | 12/2002 | McFarland et al. | |
| 6,505,279 B1 | 1/2003 | Phillips et al. | |
| 6,507,904 B1 | 1/2003 | Ellison et al. | 712/229 |
| 6,529,909 B1 | 3/2003 | Bowman-Amuah | |
| 6,535,988 B1 | 3/2003 | Poisner | 713/500 |
| 6,557,104 B1 | 4/2003 | Vu et al. | 713/189 |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | 711/163 |
| 6,633,981 B1 | 10/2003 | Davis | 713/189 |
| 6,651,171 B1 | 11/2003 | England et al. | |
| 6,678,825 B1 | 1/2004 | Ellison et al. | |
| 6,684,326 B1 | 1/2004 | Cromer et al. | |
| 6,789,126 B1 * | 9/2004 | Saulpaugh et al. | 709/245 |
| 2001/0021969 A1 | 9/2001 | Burger et al. | |
| 2001/0027511 A1 | 10/2001 | Wakabayashi et al. | |
| 2001/0027527 A1 | 10/2001 | Khidekel et al. | |
| 2001/0037450 A1 | 11/2001 | Metlitski et al. | |
| 2002/0007456 A1 | 1/2002 | Peinado et al. | |
| 2002/0023032 A1 | 2/2002 | Pearson et al. | |
| 2002/0083110 A1 * | 6/2002 | Kozuch et al. | 709/1 |
| 2002/0147916 A1 | 10/2002 | Strongin et al. | |
| 2002/0166061 A1 | 11/2002 | Falik et al. | |
| 2002/0169717 A1 | 11/2002 | Challener | |
| 2003/0018892 A1 | 1/2003 | Tello | 713/164 |
| 2003/0074548 A1 | 4/2003 | Cromer et al. | |
| 2003/0115453 A1 | 6/2003 | Grawrock | |
| 2003/0126442 A1 | 7/2003 | Glew et al. | |
| 2003/0126453 A1 | 7/2003 | Glew et al. | |
| 2003/0159056 A1 | 8/2003 | Cromer et al. | |
| 2003/0188179 A1 | 10/2003 | Challener et al. | |
| 2003/0196085 A1 | 10/2003 | Lampson et al. | |
| 2004/0117539 A1 | 6/2004 | Bennett et al. | |

FOREIGN PATENT DOCUMENTS

| | | |
|---|---|---|
| DE | 42177444 A1 | 12/1992 |
| EP | 0473913 | 3/1992 |
| EP | 0600112 A1 | 6/1994 |
| EP | 0602867 | 6/1994 |
| EP | 0892521 | 1/1999 |
| EP | 0930567 A3 | 7/1999 |
| EP | 0961193 | 12/1999 |
| EP | 0965902 | 12/1999 |
| EP | 1030237 A1 | 8/2000 |
| EP | 1055989 | 11/2000 |
| EP | 1056014 | 11/2000 |
| EP | 1085396 | 3/2001 |
| EP | 1146715 A1 | 10/2001 |
| EP | 1209563 | 5/2002 |
| EP | 1271277 | 1/2003 |
| JP | 76139 A0 | 3/2000 |
| WO | WO9524696 | 9/1995 |
| WO | WO 97/29567 A1 | 8/1997 |
| WO | WO9812620 | 3/1998 |
| WO | WO 98/34365 | 8/1998 |
| WO | WO 98/44402 | 10/1998 |
| WO | WO 99/05600 | 2/1999 |
| WO | WO 99/09482 | 2/1999 |
| WO | WO9918511 | 4/1999 |
| WO | WO 99/57863 | 11/1999 |
| WO | WO9965579 | 12/1999 |
| WO | WO0021238 | 4/2000 |
| WO | WO 00/62232 | 10/2000 |
| WO | WO 01/27723 A2 | 4/2001 |
| WO | WO 01/27821 A2 | 4/2001 |
| WO | WO0163994 | 8/2001 |
| WO | WO 01 75564 A | 10/2001 |
| WO | WO 01/75565 A2 | 10/2001 |
| WO | WO 01/75595 A2 | 10/2001 |
| WO | WO 01/175565 A2 | 10/2001 |
| WO | WO0175595 | 10/2001 |
| WO | WO0201794 | 1/2002 |
| WO | WO 02 17555 A | 2/2002 |
| WO | WO02060121 | 8/2002 |
| WO | WO 02 086684 A | 10/2002 |
| WO | WO03058412 | 7/2003 |

OTHER PUBLICATIONS

Heinrich, J., "MIPS R4000 Microprocessor User's Manual," Chapter 4, Memory Management, pp. 61-97. 1993.

Berg, Cliff, "How Do I Create A Signed Applet?" Dr. Dobb's Journal, Aug. 1997, pp. 1-9.

Goldberg, Robert P., "Survey of Virtual Machine Research," IEEE Computer Magazine vol. 7, No. 6, pp. 34-45, 1974.

Gong, Li, et al., "Going Beyond the Sandbox: An Overview of the New Security Architecture in the Java Development Kit 1.2," JavaSoft, Sun Microsystems, Inc., Proceedings of the USENIX Symposium on the Internet Technologies and Systems, Monterey, California, 11 pages Dec. 1997.

Gum, P.H., "System/370 Extended Architecture: Facilities for Virtual Machines," IBM J. Research Development, vol. 27, No. 6, pp. 530-544, Nov. 1983.

Heinrich, J., "MIPS R4000 Microprocessor User's Manual," Second Edition, Chapter 4: Memory Management, pp. 67-79.

Intel Corporation, Intel386™ DX Microprocessor, 32-Bit CHMOS Microprocessor With Integrated Memory Management, 56 pages, Dec. 1995.

Lawton, K., "Running Multiple Operation Systems Concurrently On An IA32 PC Using Virtualization Techniques," http://www.plex86.org/research/paper.txt., pp 1-31, downloaded Aug. 9, 2001.

MOTOROLA, M68040 User's Manual (Including the MC68040, MC48040V, MC68LC040, MC68EC040, and MC68EC040V), Revised 1993.

Rosenblum, M., "VMware's Virtual Platform™ A Virtual Machine Monitor for Commodity PCs," Proceedings of the 11th Hotchips Conference, Stanford University Palo Alto, California, pp. 185-196, Aug. 1999.

Brands, Stefan , "Restrictive Blinding of Secret-Key Certificates", Springer-Verlag XP002201306, (1995),Chapter 3.

Davida, George I., et al., "Defending Systems Against

Viruses through Cryptographic Authentication", *Proceedings of the Symposium on Security and Privacy*, IEEE Comp. Soc. Press, ISBN 0-8186-1939-2,(May 1989).

Intel, "IA-32 Intel Architecture Software Developer's Manual", vol. 3: *System Programming Guide*, Intel Corporation—2003, 13-1 through 13-24.

Kashiwagi, Kazuhiko , et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn , et al., "Replacement Strategy for Aging Avionics Computers", *IEEE AES Systems Magazine*, XP002190614,(Mar. 1999).

Menezes, Oorschot , "Handbook of Applied Cryptography", *CRC Press LLC*, USA XP002201307, (1997),475.

Richt, Stefan , et al., "In-Circuit-Emulator Wird Echtzeittauglich", *Elektronic, Franzis Verlag GMBH, Munchen, DE*, vol. 40, No. 16, XP000259620,(100-103),Aug. 6, 1991.

Saez, Sergio , et al., "A Hardware Scheduler for Complex Real-Time Systems", *Proceedings of the IEEE International Symposium on Industrial Electronics*, XP002190615,(Jul. 1999),43-48.

Sherwood, Timothy , et al., "Patchable Instruction ROM Architecture", *Department of Computer Science and Engineering, University of California, San Diego, La Jolla, CA*, (Nov. 2001).

Kashiwagi, Kazuhiko, et al., "Design and Implementation of Dynamically Reconstructing System Software," Software Engineering Conference, 1996 Asia Pacific Seoul, South Korea, IEEE Comput. Soc. Dec. 4, 1996, pp. 278-287.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

Coulouris, George , et al., "Distributed Systems, Concepts and Designs", *2nd Edition*, (1994),422-424.

Crawford, John , "Architecture of the Intel 80386", *Proceedings of the IEEE International Conference on Computer Design: VLSI in Computers and Processors (ICCD '86)*, (Oct. 6, 1986), 155-160.

Fabry, R.S., "Capability-Based Addressing", *Fabry, R.S., "Capability-Based Addressing," Communications of the ACM, vol. 17, No. 7*, (Jul. 1974),403-412.

Frieder, Gideon , "The Architecture And Operational Characteristics of the VMX Host Machine", *The Architecture And Operational Characteristics of the VMX Host Machine, IEEE*, (1982),9-16.

HP Mobile Security Overview, "HP Mobile Security Overview", (Sept. 2002),1-10.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002),1-6.

Intel Corporation, "IA-64 System Abstraciton Layer Specification", *Intel Product Specification*, Order No. 245359-001, (Jan. 2000),1-112.

Intel Corporation, "Intel 82802AB/82802AC Firmware Hub(FWH)", *Intel Product Datasheet*, Document No. 290658-004,(Nov. 2000),1-6, 17-28.

Intel Corporation, "Intel IA-64 Architecture Software Developer's Manual", *Volume 2: IA-64 System Architecture*, Order No. 245318-001, (Jan. 2000),i, ii, 5.1-5.3, 11.1-11.8, 11.23-11.26.

Menezes, Alfred J., et al., "Handbook of Applied Cryptography", *CRC Press Series on Discrete Mathematices and its Applications*, Boca Raton, FL, XP002165287, ISBN 0849385237,(Oct. 1996),403-405, 506-515, 570.

Nanba, S. , et al., "VM/4: ACOS-4 Virtual Machine Architecture", *VM/4: ACOS-4 Virtual Machine Architecure, IEEE*, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce , "Applied Cryptography: Protocols, Algorithm, and Source Code in C", *Wiley, John & Sons, Inc.*, XP002939871; ISBN 0471117099,(Oct. 1995),47-52.

Schneier, Bruce , "Applied Cryptography: Protocols, Algorithm, and Source Code in C", *Wiley, John & Sons, Inc.*, XP002138607; ISBN 0471117099,(Oct. 1995),56-65.

Schneier, Bruce , "Applied Cryptography: Protocols, Algorithms, and Source Code C", *Wiley, John & Sons, Inc.*, XP0021111449; ISBN 0471117099,(Oct. 1995),169-187.

Schneier, Bruce , "Applied Cryptography: Protocols, Algorithms, and Source Code in C", *2nd Edition: Wiley, John & Sons, Inc.*, XP002251738; ISBN 0471128457,(Nov. 1995),28-33; 176-177; 216-217; 461-473; 518-522.

IBM Technical Disclosure Bulletin, "Information Display Technique For A Terminate Stay Resident Program," vol. 34, Issue No. 7A, pp. 156-158, Dec. 1, 1991.

Trusted Computing Platform Alliance (TCPA), Main Specification Version 1.1a, 321 pages, Copyright 2000-2001.

\* cited by examiner

METHOD FOR RESOLVING ADDRESS SPACE CONFLICTS BETWEEN A VIRTUAL MACHINE MONITOR AND A GUEST OPERATING SYSTEM

RELATED APPLICATIONS

This application is a continuation of U.S. patent application Ser. No. 09/752,587, filed Dec. 27, 2000.

FIELD OF THE INVENTION

The present invention relates generally to virtual machines, and more specifically to resolving address space conflicts between a virtual machine monitor and a guest operating system.

BACKGROUND OF THE INVENTION

A conventional virtual machine monitor (VMM) typically runs on a computer and presents to other software the abstraction of one or more virtual machines. Each virtual machine may function as a self-contained platform, running its own "guest operating system" (i.e., an operating system hosted by the VMM). The guest operating system expects to operate as if it were running on a dedicated computer rather than a virtual machine. That is, the guest operating system expects to control various computer operations and have an unlimited access to the computer's physical memory and memory-mapped I/O devices during these operations. However, in a virtual machine environment, the VMM should be able to have ultimate control over the computer's resources to provide protection from and between virtual machines. To achieve this, the VMM typically intercepts and arbitrates all accesses made by the guest operating system to the computer resources.

With existing processors (e.g., IA-32 microprocessors), the VMM may not be able to intercept accesses of the guest operating system to hardware resources unless a portion of the VMM code and/or data structures is located in the same virtual address space as the guest operating system. However, the guest operating system does not expect the VMM code and/or data structures to reside in the address space of the guest operating system and can attempt to access a region occupied by the VMM in this address space, causing an address space conflict between the guest operating system and the VMM. This conflict may result in abnormal termination of operations performed by the VMM or the guest operating system.

Thus, a mechanism is needed that will detect and resolve address space conflicts between a VMM and a guest operating system.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1:
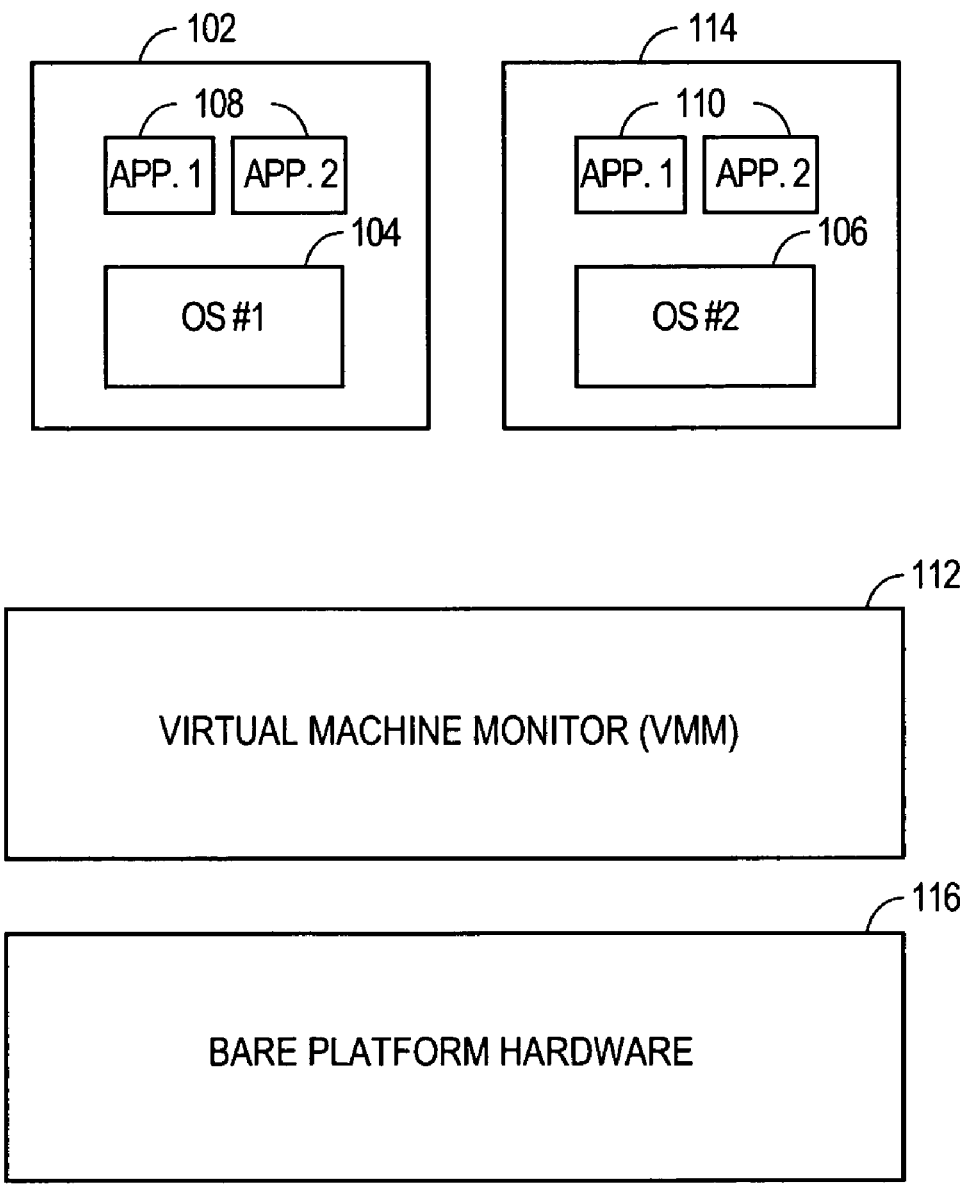
FIG. 1 illustrates one embodiment of a virtual machine environment.

A method and apparatus for resolving address space conflicts are described. In the following description, numerous details are set forth, such as distances between components, types of molding, etc. It will be apparent, however, to one skilled in the art, that the present invention may be practiced without these specific details. In other instances, well-known structures and devices are shown in block diagram form, rather than in detail, in order to avoid obscuring the present invention.

In the following description, for purposes of explanation, numerous specific details are set forth in order to provide a thorough understanding of the present invention. It will be apparent, however, to one skilled in the art that the present invention can be practiced without these specific details.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism for resolving address space conflicts between a guest operating system and a virtual machine monitor (VMM). FIG. 1 illustrates one embodiment of a virtual machine environment 100, in which the present invention may operate. In this embodiment, bare platform hardware 116 comprises a computing platform, which may be capable, for example, of executing a standard operating system (OS) or a virtual machine monitor (VMM), such as a VMM 112. A VMM, though typically implemented in software, may export a bare machine interface, such as an emulation, to higher level software. Such higher level software may comprise a standard or real-time OS, although the invention is not limited in scope in this respect and, alternatively, for example, a VMM may be run within, or on top of, another VMM. VMMs and their typical features and functionality are well-known by those skilled in the art and may be implemented, for example, in software, firmware or by a combination of various techniques.

As described above, a VMM presents to other software (i.e., "guest" software) the abstraction of one or more virtual machines (VMs). FIG. 1 shows two VMs, 102 and 114. Each VM includes a guest OS such as a guest OS 104 or 106 and various guest software applications 108–110. Each of the guest OSs 104 and 106 expects to control access to physical resources (e.g., memory and memory-mapped I/O devices) within the hardware platform on which the guest OS 104 or 106 is running and to perform other functions. However, in a virtual machine environment, the VMM 112 should be able to have ultimate control over the physical resources to provide protection from and between VMs 102 and 114. The VMM 112 achieves this goal by intercepting all accesses of the guest OSs 104 and 106 to the computer's physical resources. For instance, a guest deprivileging technique may be used to enable the VMM 112 to intercept the above accesses. Guest deprivileging forces all guest software to run at a hardware privilege level that does not allow that software access to certain hardware resources. As a result, whenever the guest OS 104 or 106 attempts to access any of these hardware resources, it "traps" to the VMM 112, i.e., the VMM 112 receives control over an operation initiated by the guest operating system if this operation involves accessing such hardware resources. It should be noted that any other technique known in the art may be used to transfer control over a similar operation from the guest OS 104 or 106 to the VMM 112.

When using guest deprivileging or other techniques enabling the VMM 112 to intercept accesses of the guest OSs 104 and 106 to the computer's physical resources, a portion of VMM code and/or data structures may be architecturally required to reside in the same virtual address space as each of the guest OSs 104 and 106. However, since the guest OSs 104 and 106 are unaware of the VMM's presence, they may attempt to access a region occupied by the VMM code and/or data structures in the virtual address space associated with the guest OS 104 or 106. Such an attempt may result in collision between the code and data structures of the guest OS and the VMM code and data structures in the virtual address space, causing an abnormal termination of an operation performed by the guest OS 104 or 106, or the VMM 112. The present invention provides a mechanism for resolving such address space conflicts.

Figure 2:
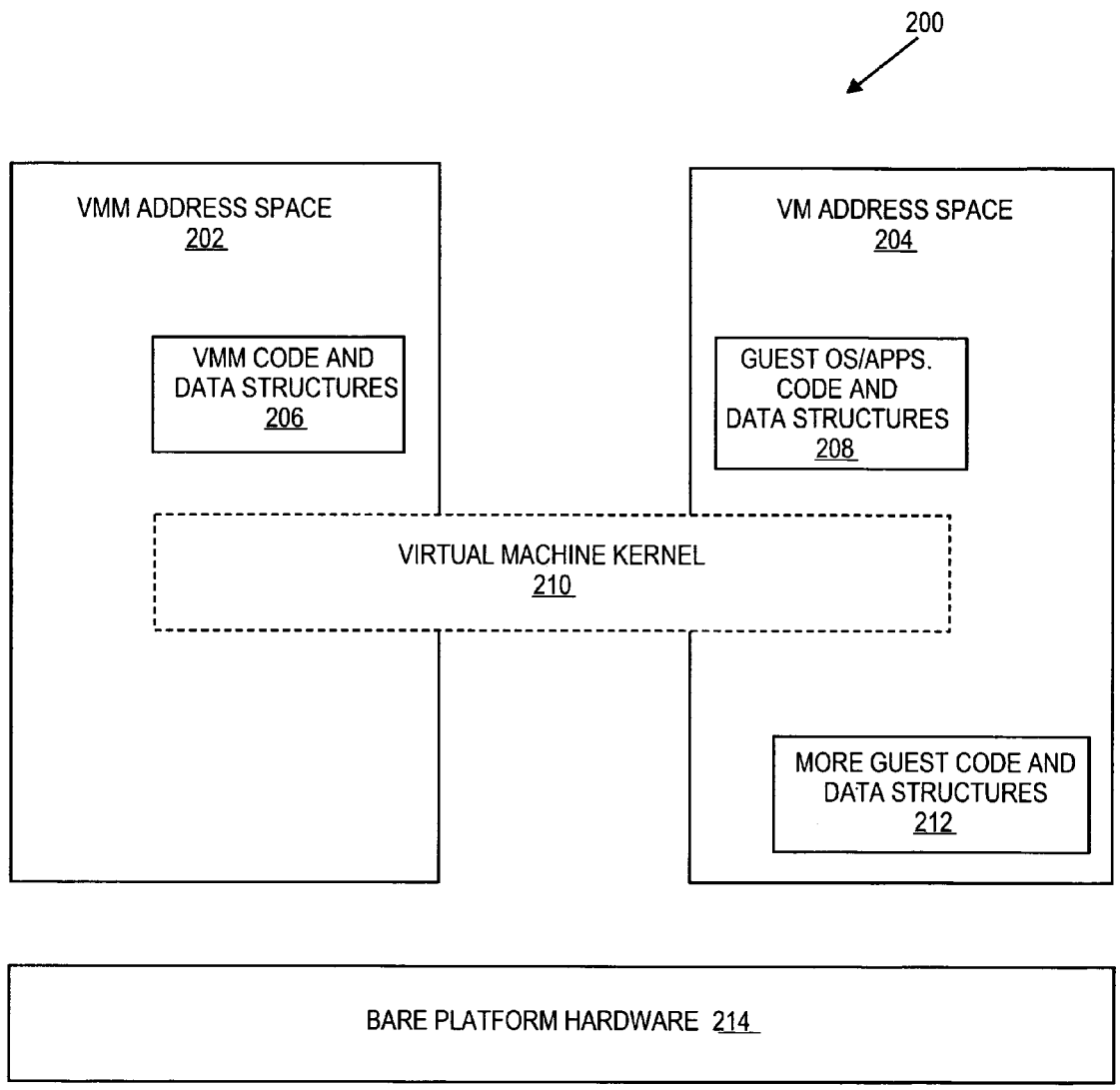
FIG. 2 is a block diagram of a system for resolving address space conflicts between a virtual machine monitor and a guest operating system, according to one embodiment of the present invention.

FIG. 2 is a block diagram of a system 200 for resolving address space conflicts between a VMM and a guest OS, according to one embodiment of the present invention. System 200 includes bare platform hardware 214 that includes a computing platform capable of executing a guest OS (e.g., guest OS 104 or 106), a VMM (e.g., VMM 112), etc. Two separate address spaces 204 and 202 are allocated for guest software and the VMM. That is, VM address space 204 is allocated to hold code and data structures of the guest OS and other guest software, and VMM address space 202 is allocated for VMM code and data structures.

As described above, certain components of the VMM code and/or data structures may be architecturally required to reside in the same address space as the guest OS to enable the VMM to intercept the guest OS's accesses to hardware resources. For instance, for the IA-32 instruction set architecture (ISA), when guest deprivileging is used to ensure control of the VMM over the guest OS's accesses to hardware resources, an interrupt-descriptor table (IDT), which includes pointers to trap handling routines, is architecturally required to reside in the same address space as the guest OS. One embodiment of the present invention that supports guest deprivileging will be described in greater detail below in conjunction with FIGS. 5 and 6. For other ISAs, various other portions of VMM code and/or data structures may be architecturally required to reside in the same space address as the guest OS to enable the VMM's control over accesses made by the guest OS to hardware resources.

In one embodiment, the VMM code and structures are divided into two portions. The first portion of the VMM includes a set of code and/or data structures that are required to reside in the address space of the guest OS, i.e., in the VM address space 204. The second portion of the VMM includes the remainder of the VMM code and data structures. In one embodiment, a software program (referred as a virtual machine kernel 210) collects a minimal set of the VMM code and/or data structures that are required to be located in the same address space as the guest OS. The remainder of the VMM code and data structures is compiled as a separate program and located in the VMM address space 202. The virtual machine kernel (VMK) 210 then maps itself into both the VM address space 204 and the VMM address space 202.

Subsequently, when the guest OS attempts to access a region occupied by the VMM code and/or data structures in the VM address space 204, the VMK 210 detects this attempt of the guest OS. In one embodiment, the VMK 210 receives control over an event initiated by the guest OS if this event may potentially cause an address space conflict between the guest OS and the VMM. Guest deprivileging or any other hardware or software mechanisms known in the art may be used to transfer control over such an event from the guest OS to the VMM code and/or data structures residing in the VM address space 204.

The VMK 210 then evaluates this event to determine its cause. Upon detecting that the event was caused by the attempt of the guest OS to access the region occupied by the VMM code and/or data structures, the VMK 210 re-maps itself into a different region within the VM address space 204 to allow the guest OS to access the region previously used by the VMK 210. One embodiment of a method for relocating the VMK 210 within the VM address space 204 is described in greater detail below in conjunction with FIG. 4.

Figure 3:
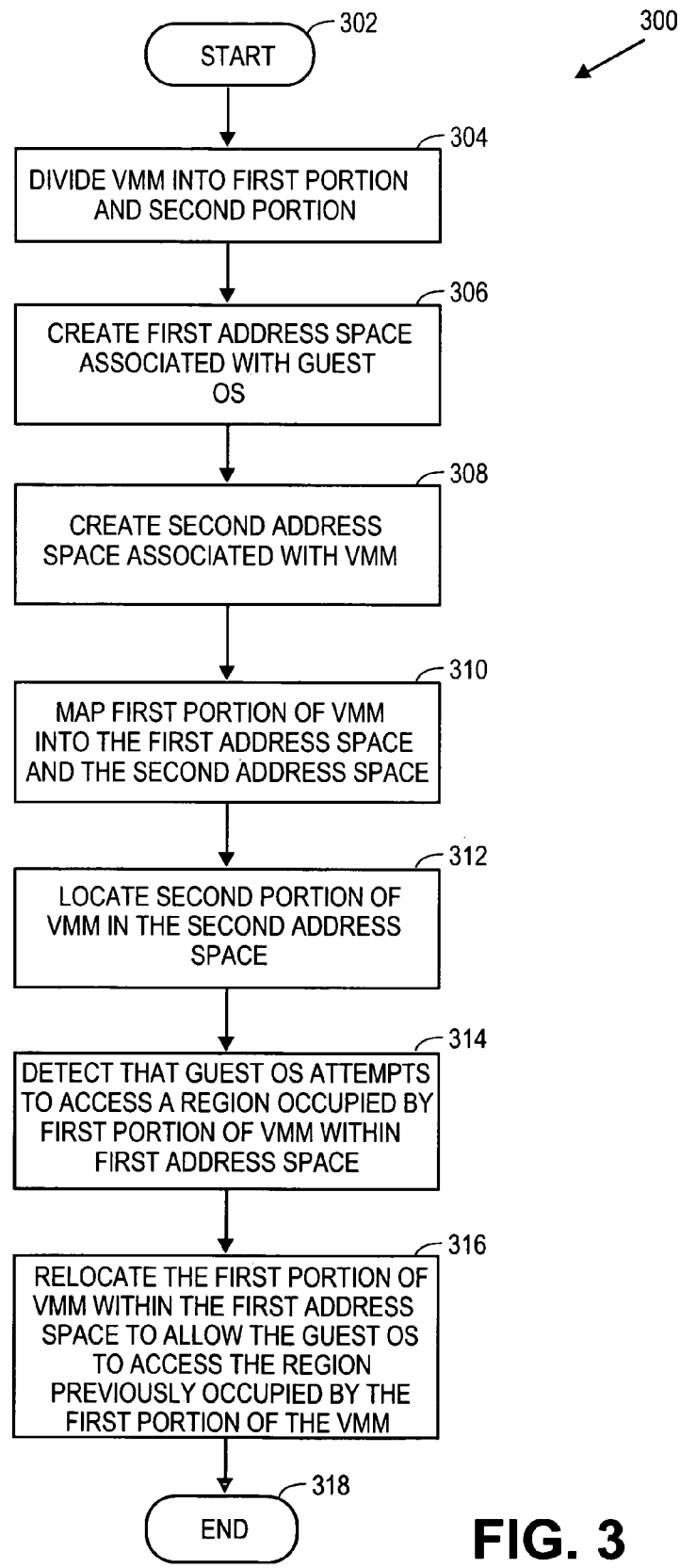
FIG. 3 is a flow diagram of a method for resolving address space conflicts between a virtual machine monitor and a guest operating system, according to one embodiment of the present invention.

FIG. 3 is a flow diagram of one embodiment of a method 300 for resolving address space conflicts between a VMM and a guest OS, according to one embodiment of the present invention. Method 300 begins with dividing the VMM into a first portion and a second portion (processing block 304). As described above, the first portion includes a set of VMM code and/or data structures that are architecturally required to reside in the same address space as the guest OS. The second portion of the VMM includes the remainder of the VMM code and data structures. In one embodiment (described in greater detail below), the first portion of the VMM includes a set of trap handlers and an interrupt-descriptor table (IDT). In alternative embodiments, the first portion includes various other data structures and code of the VMM that must reside in the same address space as the guest OS.

Next, a first address space (i.e., VM address space 204) is created to hold code and data structures of the guest OS and other guest software (processing block 306), and a second address space (i.e., VMM address space 202) is created for the VMM code and data structures (processing block 308). In one embodiment, these address spaces are created during the boot process.

Further, the first portion of the VMM is mapped into both the VM address space and the VMM address space (processing block 310), and the second portion of the VMM is loaded into the VMM address space (processing block 312).

At processing block 314, an attempt of the guest OS to access a region occupied by the first portion of the VMM is detected. In one embodiment, such an attempt is detected by transferring control over an event initiated by the guest OS to the first portion of the VMM if the event may potentially cause an address-space conflict between the guest operating system and the VMM. One embodiment of detecting a potential address space conflict is described in greater detail below in conjunction with FIGS. 5 and 6.

Afterwards, at processing block 316, the first portion of the VMM is relocated to another region within the VM address space to allow access of the guest OS to the region previously occupied by the first portion of the VMM. Any subsequent attempt to access the new region occupied by the first portion of the VMM will again result in its relocation within the VM address space. One embodiment of a method for relocating a VMK, which contains the first portion of the VMM, is shown in FIG. 4.

Figure 4:
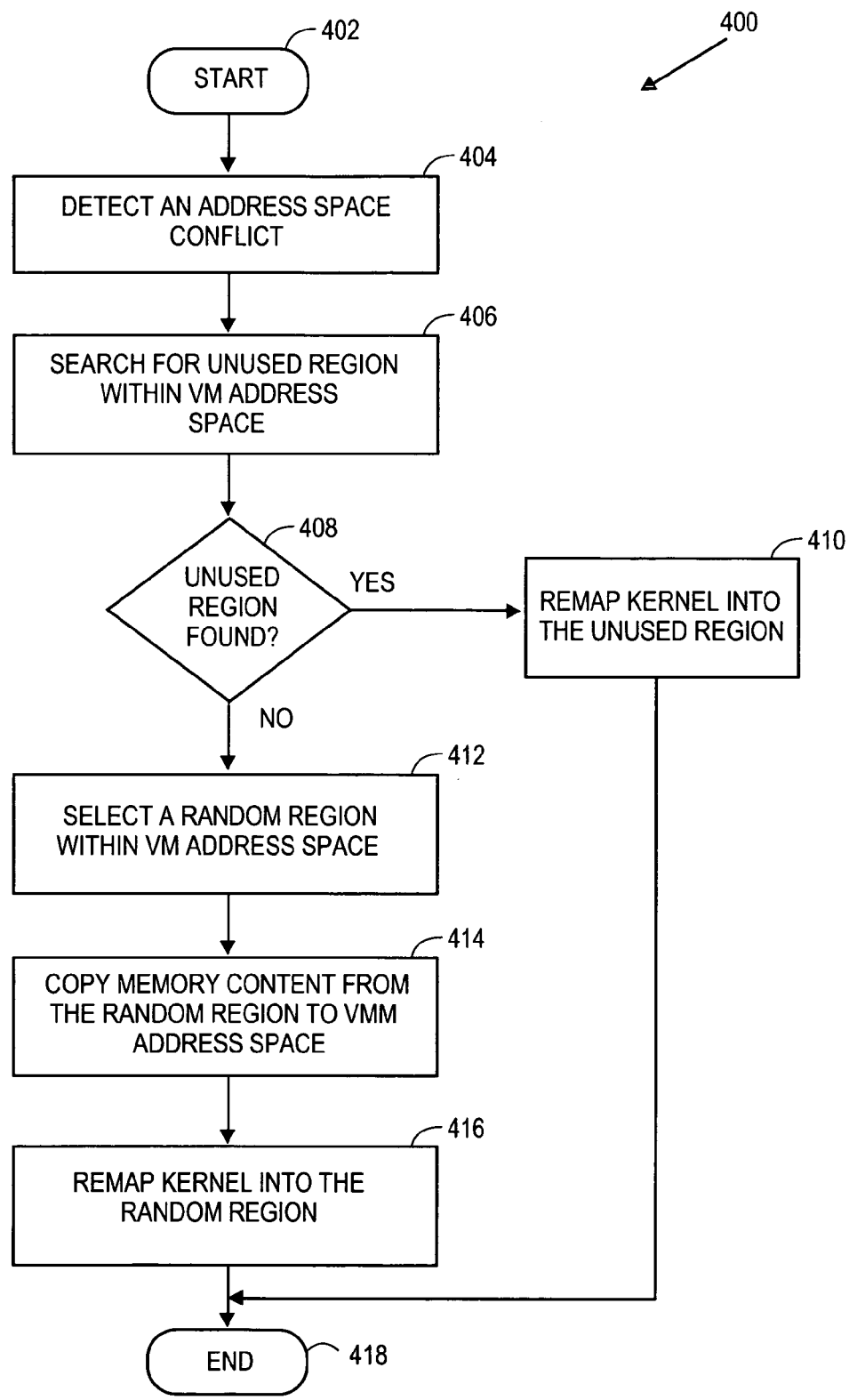
FIG. 4 is a flow diagram of a method for relocating a virtual machine kernel within a virtual machine address space, according to one embodiment of the present invention.

Referring to FIG. 4, after an address space conflict between the guest OS and the VMM is detected (processing block 404), the VM address space is searched for an unused region (processing block 406). At decision box 408, a determination is made as to whether an unused region exists in the VM address space. If the determination is positive, the VMK containing the first portion of the VMM code and data structures is remapped into this unused region, and control is transferred back to the guest OS, which may now access the region previously used by the VMK.

Alternatively, if no unused region exists in the VM address space, i.e., the guest OS has used the entire VM address space, then a random region is selected within the VM address space (processing block 412), the content of the memory located at the selected region is copied to a buffer in the VMM address space (processing block 414), and the VMK is remapped into the selected region in the VM address space (processing block 416). Subsequent memory accesses to this selected region (i.e., new VMK region) are serviced through emulated memory accesses from the buffer in the VMM address space that contains the original content of the new VMK region. In one embodiment, the frequency of such emulated memory references may be reduced by periodically relocating the VMK to random regions within the VM address space until a region is found that is infrequently used.

Figure 5:
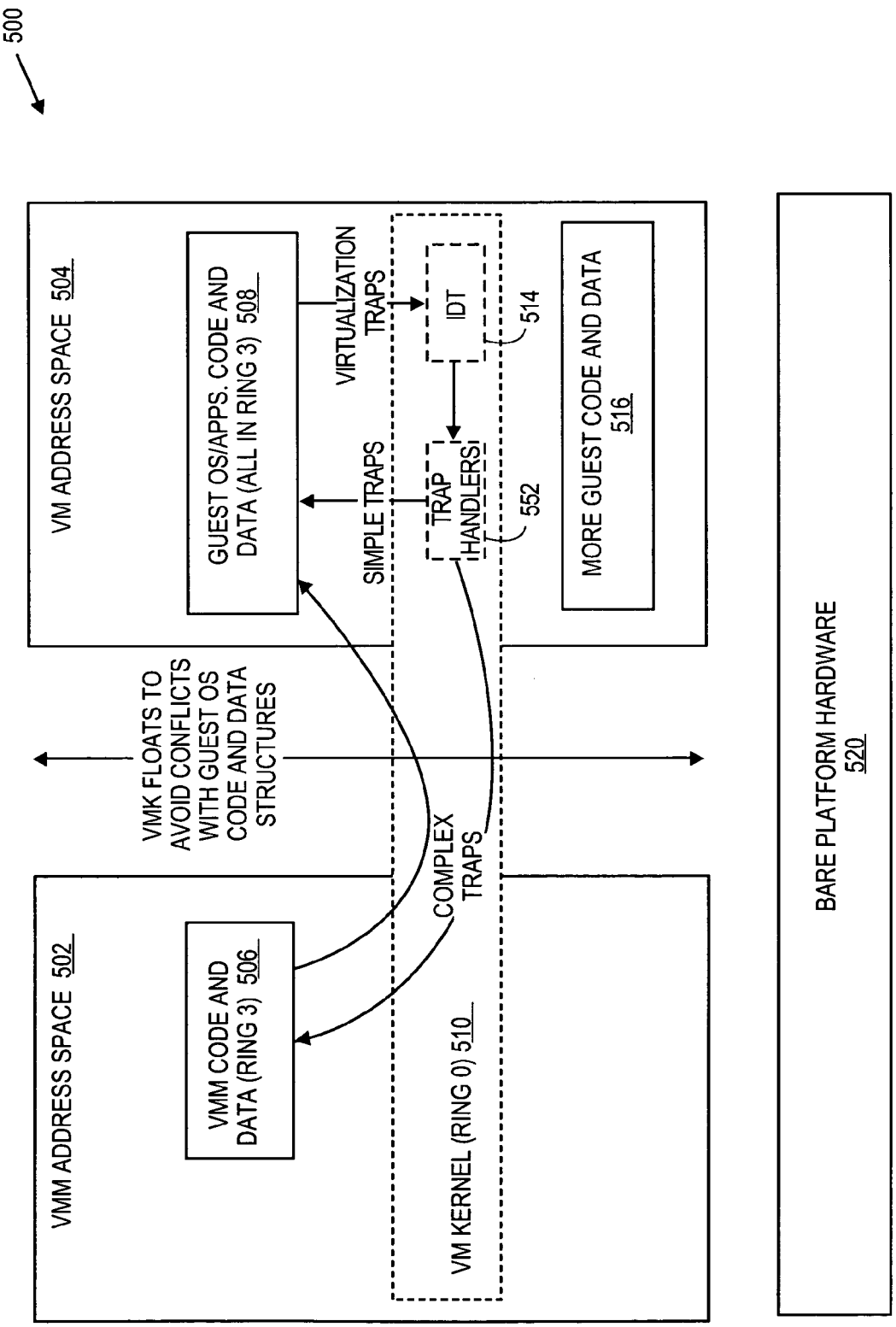
FIG. 5 illustrates operation of a virtual machine kernel that supports guest deprivileging, according to one embodiment of the present invention.

FIG. 5 illustrates operation of a VMK that supports guest deprivileging, according to one embodiment of the present invention. As described above, guest deprivileging causes the guest OS to run at a lesser privileged level so that the guest OS "traps" to the VMM whenever it attempts to issue privileged instructions that operate on the processor system state. In one embodiment, the VMM supporting guest deprivileging installs pointers to trap handling routines (i.e., trap handlers 552) in the interrupt-descriptor table (IDT) 514. Some ISAs (e.g., IA-32 ISA) require that the IDT 514 be resident in the currently active virtual address space (i.e., VM address space 504). In one embodiment, the entries in the IDT 514 are task gates, which provide an address space switch. That is, when a trap is generated, the IDT 514 is searched for a pointer to a trap handling routine. If this pointer is a task gate, it will enable a direct switch to the VMM address space, which contains a trap handling routine for the generated trap. Accordingly, a trap handler corresponding to a task gate does not need to reside in the VM address space, although the task gate itself must reside in the VM address space. In another embodiment, entries in the IDT 514 are trap gates or interrupt gates, which do not provide address space switches. Consequently, trap handlers associated with such IDT entries must reside in the VM address space. In addition, the VMM may place shadow versions of other data structures (e.g., global descriptor table) in the VM address space.

In one embodiment, the VMK 510 collects together a minimal set of trap handlers and/or data structures (e.g., the IDT 514) that must be located in the VM address space, maps them into both the VM address space 504 and the VMM address space 502, and sets access rights of the pages holding the VMK 510 to the most privileged level (e.g., the "supervisor" privilege level with ring=0 for IA-32 microprocessors). As described above, the guest OS runs in the deprivileged mode (e.g., the "user" mode with ring=3 for IA-32 microprocessors). As a result, in one embodiment, the guest OS generates virtualization traps whenever it attempts to access privileged machine resources, including the pages holding the VMK 510 that are protected with the most privileged access rights.

In one embodiment, when a virtualization trap is generated, the IDT 514 is searched for a corresponding pointer to a trap handler. In one embodiment, a trap may need to be handled by the VMM-resident trap handler. In this embodiment, the VMK performs two address space switches—one switch to deliver the trap to the trap handler in the VMM address space 502, and a second switch to transition back to the VM address space 504 after the trap has been serviced by VMM-resident trap-handler.

Alternatively, a trap can be handled in a VMK-resident handler. For instance, a trap may be caused by an instruction of the guest OS to reset a flag in the processor's register. Such a trap can be handled entirely in the trap handler 552, without transferring control to the VMM in the VMM address space 502, and such an implementation would result in better performance.

One type of virtualization traps is a conflict fault which is generated when the guest OS attempts to access a region of the VM address space 504 that is currently in use by the VMK 510. The VMK 510 handles these conflict faults by re-mapping itself into a new region within the VM address space 504 as described in greater detail above in conjunction with FIG. 4.

Figure 6:
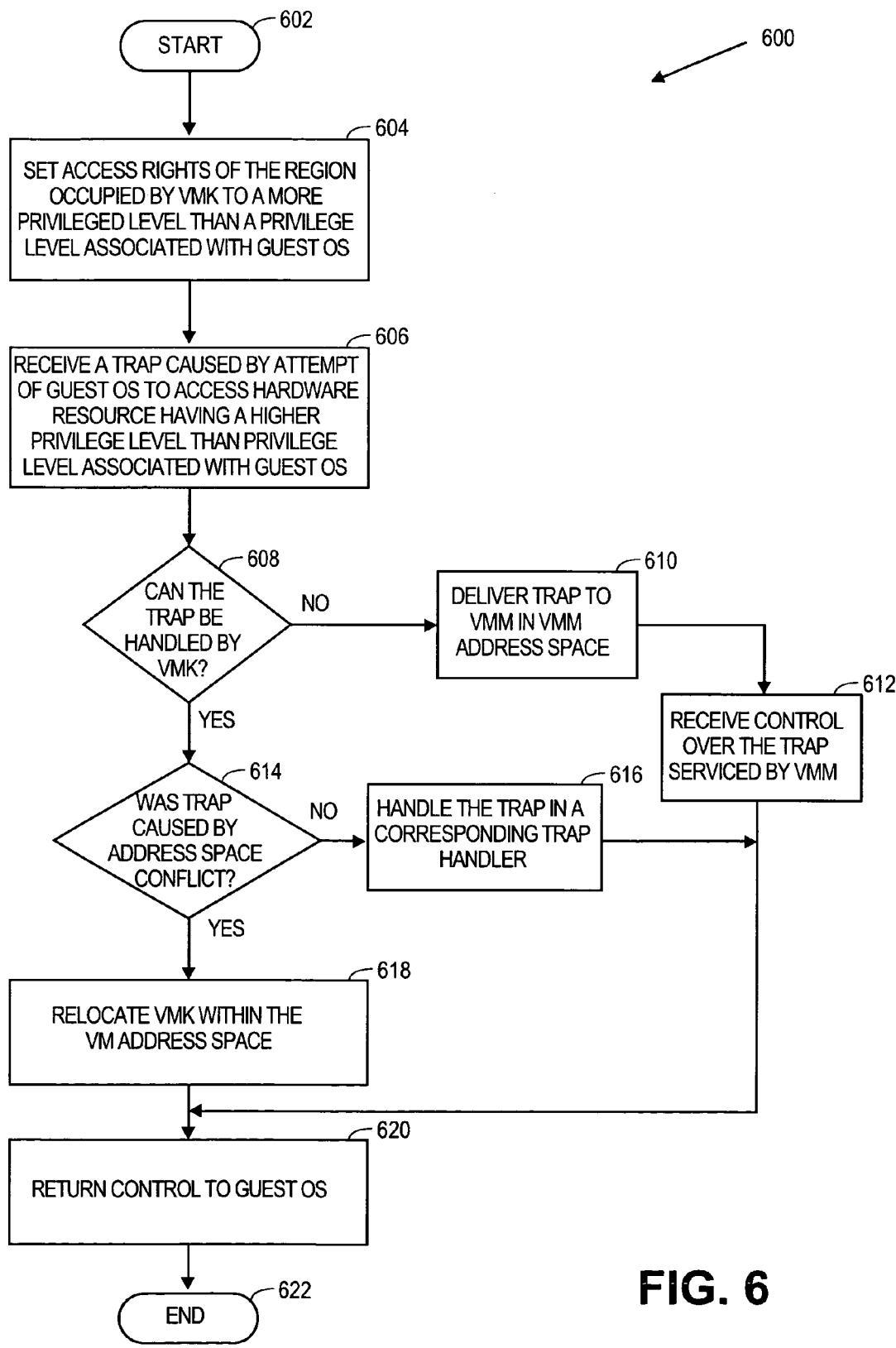
FIG. 6 is a flow diagram of a method for handling a virtualization trap generated by a guest operating system, according to one embodiment of the present invention.

FIG. 6 is a flow diagram of a method 600 for handling virtualization traps generated by a guest OS, according to one embodiment of the present invention. Method 600 begins with setting access rights of the region occupied by the VMK to a more privileged level than a privilege level associated with the guest OS (processing block 604). For instance, all VMK pages may be mapped with supervisor-only privilege (ring=0) and the guest OS may be set to run in the deprivileged user mode (ring=3).

At processing block 606, a trap generated by the guest OS is received. The trap is caused by an attempt of the guest OS to access privileged hardware resources. At decision box 608, a determination is made as to whether the trap can be handled internally by the VMK (e.g., in a VMK-resident trap handler). If the trap is too complex to be handled by the VMK, it is delivered to the VMM address space (e.g., to a VMM-resident trap handler) (processing block 610) and then resumed back to the VM address space after the trap has been serviced by the VMM (processing block 612). Afterwards, control over the event that caused the trap is returned to the guest OS (processing block 620).

Alternatively, if the trap can be handled internally by the VMK, a determination is made as to whether the trap was caused by an address space conflict between the VMK code and data structures and the code and data structures of the guest OS (decision box 614). If the trap was indeed caused by an address space conflict, the VMK code and data structures are relocated to a new region within the VM address space (processing block 618). Alternatively, the trap is handled in a corresponding trap handler (processing block 616). Afterwards, control over the event that caused the trap is returned to the guest OS (processing block 620).

Figure 7:
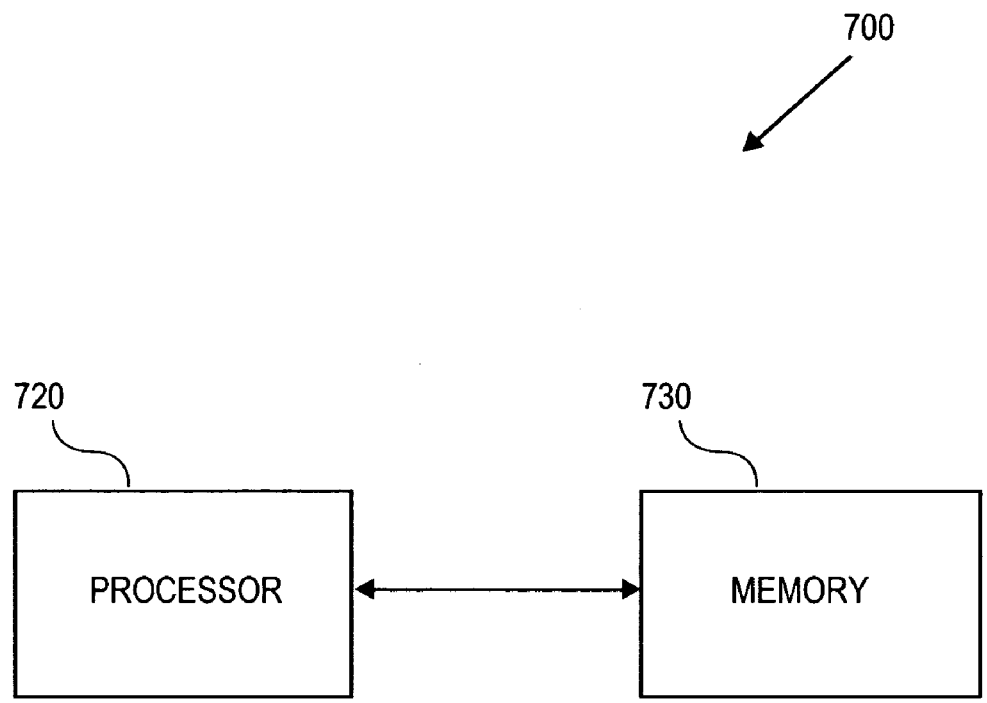
FIG. 7 is a block diagram of one embodiment of a processing system.

FIG. 7 is a block diagram of one embodiment of a processing system. Processing system 700 includes processor 720 and memory 730. Processor 720 can be any type of processor capable of executing software, such as a microprocessor, digital signal processor, microcontroller, or the like. Processing system 700 can be a personal computer (PC), mainframe, handheld device, portable computer, set-top box, or any other system that includes software.

Memory 730 can be a hard disk, a floppy disk, random access memory (RAM), read only memory (ROM), flash memory, or any other type of machine medium readable by processor 720. Memory 730 can store instructions for performing the execution of the various method embodiments of the present invention such as methods 300, 400 and 600 (FIGS. 3, 4 and 6).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    allocating a first address space for a guest operating system;
    allocating a second address space for a virtual machine monitor (VMM);
    mapping a first portion of the VMM into the first address space and the second address space;
    locating a second portion of the VMM in the second address space;
    detecting that the guest operating system attempts to access a region occupied by the first portion of the VMM within the first address space; and
    relocating the first portion of the VMM within the first address space to allow the guest operating system to access the region previously occupied by the first portion of the VMM.

2. The method of claim 1 wherein the first portion of the VMM includes a set of VMM code and data structures that are architecturally required to reside in the first address space.

3. The method of claim 1 wherein the first portion of the VMM includes a set of trap handlers and an interrupt-descriptor table (IDT).

4. The method of claim 1 further comprising:
    dividing the VMM into the first portion and a second portion.

5. The method of claim 1 further comprising:
    receiving control over an event initiated by the guest operating system when the event may potentially cause an address space conflict between the guest operating system and the VMM.

6. The method of claim 5 wherein receiving control further comprises:
    setting access rights of the section occupied by the first portion of the VMM to a more privileged level than a privilege level associated with the guest operating system; and
    receiving a trap caused by an attempt of the guest operating system to access a hardware resource having a higher privilege level than the privilege level associated with the guest operating system.

7. The method of claim 6 further comprising:
    determining that the trap can be handled by the first portion of the VMM;

executing code associated with the trap; and
returning control over the event to the guest operating system.

8. The method of claim 6 further comprising:
determining that the trap should be handled by the second portion of the VMM;
delivering the trap to the second portion of the VMM;
passing control over the event to the guest operating system after code associated with the trap was executed by the second portion of the VMM.

9. The method of claim 1 wherein relocating the first portion of the VMM further comprises:
finding an unused region within the first address space; and
re-mapping the first portion of the VMM into the unused region.

10. The method of claim 1 wherein relocating the first portion of the VMM further comprises:
determining that no unused region exists within the first address space;
selecting a random region within the first address space;
copying content of a memory located at the random region to the second address space; and
re-mapping the first portion of the VMM into the random region.

11. The method of claim 10 further comprising:
receiving control over an event initiated by the guest operating system, the event corresponding an attempt of the guest operating system to access the content of the memory previously located at the random region; and
accessing the copied content of the memory in the second address space.

12. The method of claim 11 further comprising periodically relocating the first portion of the VMM to random regions within the first address space until finding a region that is infrequently accessed.

13. An apparatus comprising:
a first address space associated with a guest operating system;
a second address space associated with a virtual machine monitor (VMM); and
a virtual machine kernel to allocate the first address space for the guest operating system, to allocate the second address space for the VMM, to map a first portion of the VMM into the first address space and the second address space, to locate a second portion of the VMM in the second address space, to detect that the guest operating system attempts to access a region occupied by the first portion of the VMM within the first address space and to relocate the first portion of the VMM within the first address space to allow the guest operating system to access the region previously occupied by the first portion of the VMM.

14. The apparatus of claim 13 wherein the first portion of the VMM includes a set of VMM code and data structures that are architecturally required to reside in the first address space.

15. The apparatus of claim 13 wherein the first portion of the VMM includes a set of trap handlers and an interrupt-descriptor table (IDT).

16. The apparatus of claim 13 wherein the virtual machine kernel is to divide the VMM into the first portion and the second portion.

17. The apparatus of claim 13 wherein the virtual machine kernel is to receive control over an event initiated by the guest operating system when the event may potentially cause an address space conflict between the guest operating system and the VMM.

18. The apparatus of claim 13 wherein the virtual machine kernel is to receive control by setting access rights of the section occupied by the first portion of the VMM to a more privileged level than a privilege level associated with the guest operating system, and by receiving a trap caused by an attempt of the guest operating system to access a hardware resource having a higher privilege level than the privilege level associated with the guest operating system.

19. The apparatus of claim 18 wherein the virtual machine kernel is to further determine that the trap can be handled by the first portion of the VMM, to execute code associated with the trap, and to return control over the event to the guest operating system.

20. The apparatus of claim 18 wherein the virtual machine kernel is to further determine that the trap should to handled by the second portion of the VMM, to deliver the trap to the second portion of the VMM, and to pass control over the event to the guest operating system after code associated with the trap was executed by the second portion of the VMM.

21. The apparatus of claim 13 wherein the virtual machine kernel is to relocate the first portion of the VMM by finding an unused region within the first address space and re-mapping the first portion of the VMM into the unused region.

22. The apparatus of claim 13 wherein the virtual machine kernel is to relocate the first portion of the VMM by determining that no unused region exists within the first address space, selecting a random region within the first address space, copying content of a memory located at the random region to the second address space, and re-mapping the first portion of the VMM into the random region.

23. The apparatus of claim 13 wherein the virtual machine kernel is to receive control over an event initiated by the guest operating system, the event corresponding to an attempt of the guest operating system to access the content of the memory previously located at the random region, and to access the copied content of the memory in the second address space.

24. The apparatus of claim 13 wherein the virtual machine kernel is to periodically relocate the first portion of the VMM to random regions within the first address space until finding a region that is infrequently accessed.

25. A system comprising:
a memory to include a first address space associated with a guest operating system and a second address space associated with a virtual machine monitor (VMM); and
a processor, coupled to the memory, to allocate the first address space for the guest operating system, to allocate the second address space for the VMM, to map a first portion of the VMM into the first address space and the second address space, to locate a second portion of the VMM in the second address space, to detect that the guest operating system attempts to access a region occupied by the first portion of the VMM within the first address space and to relocate the first portion of the VMM within the first address space to allow the guest operating system to access the region previously occupied by the first portion of the VMM.

26. The system of claim 25 wherein the first portion of the VMM includes a set of VMM code and data structures that are architecturally required to reside in the first address space.

27. The system of claim 25 wherein the first portion of the VMM includes a set of trap handlers and an interrupt-descriptor table (IDT).

28. A computer readable medium that provides instructions, which when executed on a processor, cause said processor to perform operations comprising:
- allocating a first address space for a guest operating system;
- allocating a second address space for a virtual machine monitor (VMM);
- mapping a first portion of the VMM into the first address space and the second address space;
- locating a second portion of the VMM in the second address space;
- detecting that the guest operating system attempts to access a region occupied by the first portion of the VMM within the first address space; and
- relocating the first portion of the VMM within the first address space to allow the guest operating system to access the region previously occupied by the first portion of the VMM.

29. The computer readable medium of claim 28 comprising further instructions causing the processor to perform operations comprising:
- finding an unused region within the first address space; and
- re-mapping the first portion of the VMM into the unused region.

30. The computer readable medium of claim 28 comprising further instructions causing the processor to perform operations comprising:
- determining that no unused region exists within the first address space;
- selecting a random region within the first address space;
- copying content of a memory located at the random region to the second address space; and
- re-mapping the first portion of the VMM into the random region.

* * * * *